United States Patent

Carluccio et al.

[11] Patent Number: 5,910,299
[45] Date of Patent: Jun. 8, 1999

[54] ERS-10 ZEOLITE AND PROCESS FOR ITS PREPARATION

[75] Inventors: Luciano Carluccio, Milan; Roberto Millini, Cerro Al Lambro; Giuseppe Bellussi, Piacenza, all of Italy

[73] Assignee: Eniricerche S.p.A., San Donato Milanese, Italy

[21] Appl. No.: 08/812,967

[22] Filed: Mar. 5, 1997

[30] Foreign Application Priority Data

Mar. 21, 1996 [IT] Italy .................... MI96A0556

[51] Int. Cl.$^6$ .......................... C01B 39/04; C01B 39/48
[52] U.S. Cl. .................. 423/706; 423/718; 208/118; 585/467; 585/481; 585/520; 585/666; 585/671; 585/722
[58] Field of Search .................. 423/706, 718; 502/61, 73, 85; 208/118; 585/467, 481, 520, 666, 671, 722

[56] References Cited

U.S. PATENT DOCUMENTS

| | | |
|---|---|---|
| 4,528,171 | 7/1985 | Casci et al. ................... 423/718 |
| 4,568,654 | 2/1986 | Valyocsik ..................... 423/718 |
| 4,610,854 | 9/1986 | Zones .......................... 423/718 |
| 4,640,829 | 2/1987 | Rubin .......................... 423/706 |
| 4,645,655 | 2/1987 | Whittam ....................... 423/718 |
| 5,246,690 | 9/1993 | Bellussi et al. . |
| 5,290,533 | 3/1994 | Bellussi et al. . |
| 5,385,718 | 1/1995 | Casci et al. ................... 423/718 |
| 5,645,812 | 7/1997 | Nakagawa ..................... 423/706 |

FOREIGN PATENT DOCUMENTS 0 042 226   12/1981   European Pat. Off. .

*Primary Examiner*—Mark L. Bell
*Assistant Examiner*—David Sample
*Attorney, Agent, or Firm*—Oblon, Spivak, McClelland, Maier & Neustadt, P.C.

[57] ABSTRACT

A porous, crystalline material, designated ERS-10 zeolite, having in its calcined and anhydrous form a molecular composition of oxides corresponding to the formula (I):

$$mM_{2/n}O.zX_2O_3.YO_2 \qquad (1)$$

wherein m, n, M, z, X and Y are as defined herein, the crystalline material having an X-ray diffraction spectrum shown in Table 1 herein.

32 Claims, 4 Drawing Sheets

ERS-10 ZEOLITE AND PROCESS FOR ITS PREPARATION

FIELD OF THE INVENTION

The present invention relates to a novel porous crystalline material, hereafter designated ERS-10 zeolite, and a process for its preparation which uses an azo spiro compound having general formula (II) as organic templating agent.

BACKGROUND OF THE INVENTION

The invention also relates to the use of this material as a catalyst in conversion processes of hydrocarbons, as molecular sieve and ion exchanger.

Zeolites, of both natural and synthetic origin, are aluminosilicates of a porous crystalline nature consisting of a three-dimensional framework of $TO_4$ tetrahedrons, wherein T can be silicon or aluminum. The presence of trivalent aluminum in tetrahedric coordination in the crystalline lattice determines an excess negative charge which is balanced by ions of alkaline metals (Na, K, Rb, Li and Cs), alkaline earth metals (Mg and Ca), organic ammonium cations or the H ion.

There is a large number of zeolitic phases of which the crystalline structure is for the most part known. Each of these is characterized by the presence of a particular porous system represented by canals and/or cages with regular and well-defined dimensions within the range of 3–15 Å. On the basis of the average dimensions of the pores, zeolites are generally grouped into "small", "medium" and "large" pores. These characteristics make zeolites useful in a wide range of fields such as ion exchange, separation of mixtures of gases or liquids or as catalysts in various conversion reactions of hydrocarbons.

Zeolites are typically prepared by reacting under hydrothermal conditions a reaction mixture containing a silica source, an aluminum source, an organic templating agent and, optionally, a salt of an alkali or alkaline earth metal. The templating agent, which under suitable conditions, has the function of directing the synthesis of the zeolite towards a well-determined structure, is generally selected from amines and organic quaternary ammonium or phosphonic salts.

The nature of the zeolite obtained depends on the composition of the reaction mixture, the reaction conditions and, above all, the nature of the organic templating agent used.

For example, using tetra ethylammonium hydroxide (Et NOH) as templating agent, beta zeolite is obtained (U.S. Pat. No. 3,308,069), whereas using tetra-propylammonium hydroxide (n-Pr$_4$NOH), ZSM-5 zeolite is obtained (U.S. Pat. No. 3,702,886). In some cases zeolites with different structures can be synthesized using the same organic templating agent, but with different synthesis conditions (U.S. Pat. No. 4,016,245, EP-293.032, U.S. Pat. No. 4,052,472).

DESCRIPTION OF THE INVENTION

It has now been found, according to the present invention, that the use of an azo spiro compound having general formula (II) as organic templating agent enables a novel porous crystalline material to be obtained, hereafter designated ERS-10 zeolite, which is catalytically active.

In accordance with this, the present invention relates to a porous crystalline material ERS-10 having in its calcined and anhydrous form, a molar composition of oxides corresponding to the following formula (I):

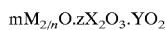

$$mM_{2/n}O \cdot zX_2O_3 \cdot YO_2 \quad (I)$$

wherein: m is a number between 0.01 and 10, M is H$^+$ and/or a cation of an alkaline or alkaline earth metal with valence n, z is a number between 0 and 0.02, X represents one or more elements selected from aluminum, iron, gallium, boron, vanadium, arsenic, antimonium, chromium and manganese and Y represents one or more elements selected from silicon, germanium, titanium, zirconium.

X is preferably aluminum or aluminum partially substituted with an element selected from iron, gallium, boron, vanadium, arsenic, antimonium, chromium and manganese and Y is silicon or silicon partially substituted with an element selected from germanium, titanium, zirconium.

The ERS-10 zeolite in its calcined form is characterized by an X-ray diffraction pattern from powders, recorded with a vertical goniometer equipped with an electronic impulse counter system and using CuK radiation ($\lambda$=1,54178 Å), containing the main reflections shown in table 1 and FIG. 1:

TABLE 1

| d (Å) | I/I$_0$·100 |
|---|---|
| 11.0 ± 0.1 | vs |
| 6.80 ± 0.08 | w |
| 5.79 ± 0.06 | w |
| 4.59 ± 0.05 | m |
| 4.29 ± 0.05 | vs |
| 3.96 ± 0.04 | m |
| 3.69 ± 0.03 | w |
| 3.41 ± 0.03 | w |
| 3.33 ± 0.03 | w |
| 3.26 ± 0.02 | m |
| 3.07 ± 0.02 | w |
| 2.68 ± 0.01 | w |
| 2.57 ± 0.01 | w |
| 2.51 ± 0.01 | w |
| 2.38 ± 0.01 | w |
| 2.31 ± 0.01 | w |
| 2.28 ± 0.01 | w |
| 2.11 ± 0.01 | w |
| 2.03 ± 0.01 | w |
| 1.94 ± 0.01 | w | wherein: d indicates the interplanar distance, I/I$_0$·100 indicates the relative intensity representing the percentage fraction of the height of the peaks compared to the height of the most intense peak, the symbol vs indicates a very strong intensity (60–100), s is a strong intensity (40–60), m is a medium intensity (20–40) and w is a weak intensity (0–20).

The ERS-10 zeolite also has an overall pore volume of between 0.13 and 0.19 cm$^3$/g, with a surface area of about 350 m$^2$/g.

Using a Philips EM400T transmission electronic microscope (TEM) operating at 120 KeV and with a controlled electronic beam intensity to avoid possible damage to the material, it was possible to obtain images relating to the porous crystalline structure of the ERS-10 zeolitic material. The samples were first englobed in epoxy resin and, after its hardening, cut into sections with an ultramicrotome equipped with a diamond blade to obtain sections with a thickness varying from 300 to 700 Å. The same sections were then deposited on copper grids and the images collected on crystals suspended on the holes of the grid itself to avoid overlapping with the support.

FIG. 3 shows a micrograph relating to an agglomerate of ERS-10 crystallites from which it is possible to have a direct visible view of the porous structure of the zeolitic material. In particular, this structure is well defined in the zone indicated with A in the micrograph of FIG. 3 and in the relative enlargement (FIG. 4), in which the pores (light-colored) are arranged according to an oblique bidimensional pattern. Owing to the limited resolving power of the TEM instrument used (punctual resolution 3.7 Å), it is not possible to accurately measure the dimensions of the pores.

The ERS-10 zeolite according to the present invention is obtained by a process which comprises:

(a) preparing an aqueous solution optionally containing at least one compound capable of hydrolyzing to $X_2O_3$, at least one compound capable of hydrolyzing to $YO_2$, a source of cations of an alkali or alkaline earth metal or mixtures of these and an organic templating agent (Q) characterized in that said templating agent is an azo spiro compound having general formula (II)

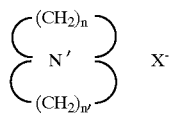  (II)

wherein: n and n', the same or different, represent an integer between 3 and 6 and $X^-$ is an anion selected from $OH^-$, chloride, bromide, fluoride and iodide, and wherein the quantity of reagents is such as to respect the following molar ratios:

$YO_2/X_2O_3$ from 50/1 to ∞
$OH^-/YO_2$ from 0.15/1 to 0.7/1
$Q/YO_2$ from 0.1/1 to 0.5/1
$H_2O/YO_2$ from 20/1 to 60/1
$M^+/YO_2$ from 0.05/1 to 0.20/1

(b) maintaining the solution obtained in (a) under sufficient conditions to form a solid crystalline material;
(c) drying the solid crystalline material which in its anhydrous form has a molar composition of oxides, corresponding to the general formula (III)

$$yQ_2O.mM_{2/n}O.zX_2O_3.YO_2 \qquad (III)$$

wherein: y has a value between 0.1 and 1, Q is the organic templating agent having general formula (II), M is a cation of an alkali and/or alkaline earth metal and m, n, z, X and Y have the same meaning defined above;
(d) calcining the crystalline material having formula (III) obtained in step (c); and
(e) at least partly substituting the cation M with $H^+$ to obtain the ERS-10 zeolite having general formula (I) in acid form.

When X is aluminum or partially substituted aluminum the compounds which can be used in step a) of the process of the present invention are selected from aluminum isopropylate, aluminum sulfate, $NaAlO_2$. Aluminum isopropylate and aluminum sulfate are preferred.

When Y is silicon or partially substituted silicon the compounds can be selected from tetraethylorthosilicate (TES), colloidal silica (LUDOX®), sodium silicate, pyrophoric silica (AEROSIL®). TES and LUDOX® are preferred.

Sodium or potassium hydroxide are preferably used as cation sources in step (a) of the process of the present invention.

As organic templating agent (Q) it is preferable to use a compound having formula (II) wherein n and n' are the same and have a value equal to 5 and $X^-$ is $OH^-$ The order of the addition of the components of the solution in step (a) is not critical. However it is preferable to initially form an aqueous solution containing the organic templating agent, optionally at least one compound capable of hydrolyzing to $X_2O_3$ and the cation source and adding at least one compound capable of hydrolyzing to $YO_2$ to this solution.

In any case the following molar ratios must be respected in the resulting solution:

$YO_2/X_2O_3$ from 50/1 to ∞
$OH^-/YO_2$ from 0.15/1 to 0.7/1
$Q/YO_2$ from 0.1/1 to 0.5/1
$H_2O/YO_2$ from 20/1 to 60/1
$M^+/YO_2$ from 0.05/1 to 0.20/1

The preferred values of these ratios are:
$YO_2/X_2O_3$ from 80/1 to ∞
$OH^-/YO_2$ from 0.2/1 to 0.45/1
$Q/YO_2$ from 0.2/1 to 0.3/1
$H_2O/YO_2$ from 40/1 to 50/1
$M^+/YO_2$ from 0.09/1 to 0.15/1

In step (b) of the process of the present invention, the crystallization is carried out within a temperature range of 150 to 180° C. and preferably around 170° C.

The reaction time can vary in relation to the temperature, concentrations and other factors and is normally between 3 and 28 days, preferably between 7 and 14 days. The reaction is generally carried out at autogenous pressure and, preferably, under stirring.

At the end of the reaction, the solid crystalline phase is separated from the mother liquor with the conventional techniques, for example filtration, washed with demineralized water and subjected to drying in step (c) of the process of the present invention.

This drying is conveniently carried out at temperatures up to about 170° C. and preferably around 90–120° C., for a time which is sufficient to completely or almost completely eliminate the water.

The crystalline material having general formula (III) after drying has an X-ray diffraction pattern of the powders, determined as described above, containing the main reflections in table 2 and FIG. 2.

TABLE 2

| d (Å) | $I/I_0.100$ |
|---|---|
| 11.1 ± 0.1 | s |
| 6.82 ± 0.08 | w |
| 5.83 ± 0.06 | w |
| 4.64 ± 0.05 | m |
| 4.32 ± 0.05 | vs |
| 4.00 ± 0.04 | s |
| 3.72 ± 0.03 | m |
| 3.42 ± 0.03 | w |
| 3.35 ± 0.03 | w |
| 3.27 ± 0.02 | m |
| 3.08 ± 0.02 | w |
| 2.70 ± 0.01 | w |
| 2.58 ± 0.01 | w |
| 2.54 ± 0.01 | w |
| 2.39 ± 0.01 | w |
| 2.32 ± 0.01 | w |
| 2.29 ± 0.01 | w |
| 2.12 ± 0.01 | w |
| 2.11 ± 0.01 | w |
| 1.94 ± 0.01 | w |

In step (d) of the process of the present invention the crystalline material having formula (III) is subjected to calcination to eliminate the organic templating agent trapped in the porous system. This treatment is generally carried out in an oxidating atmosphere, for example in air. The calcination temperatures are within the range of 500 to 700° C. and preferably from 550 to 650° C. The calcination times can vary from 4 to 20 hours and are typically around 6–15 hours.

In step e) of the process of the present invention the at least partly substitution of the cation M with H can be carried out by ion exchange using an acid, especially a mineral acid such as hydrochloric acid, or an ammonium salt such as ammonium acetate and subsequent calcination.

In particular, the zeolite exchanged in the form of ammonia can be obtained by triple treatment with a solution of ammonium acetate at 80° C. for 1 hour, under magnetic stirring; at the end, the product is filtered, repeatedly washed with demineralized water, dried and then calcined under the conditions described above.

The ERS-1- zeolite in calcined and acid form has an X-ray diffraction pattern of the powders similar to that shown in table 1.

The catalyst can be subjected, if desired, to shaping treatment by extrusion or the like, to transform the solid into the physical form desired for final use.

In fact, depending on the type of reactor, the ERS-10 zeolitic material of the present invention can be used in the form of microspheres, granules or pellets of different shapes and forms.

The ERS-10 catalyst of the present invention in acid form is active in chemical reactions which require an acid catalysis such as for example conversion reactions of hydrocarbons such as cracking, isomerizations, oligomerizations, alkylations, hydrotreatment, etc. The ERS-10 catalyst of the present invention can also be applied as ion exchanger and molecular sieve.

The following examples, whose only purpose is to describe the present invention in greater detail, should in no way be interpreted as limiting its scope.

EXAMPLE 1

Figure 1:
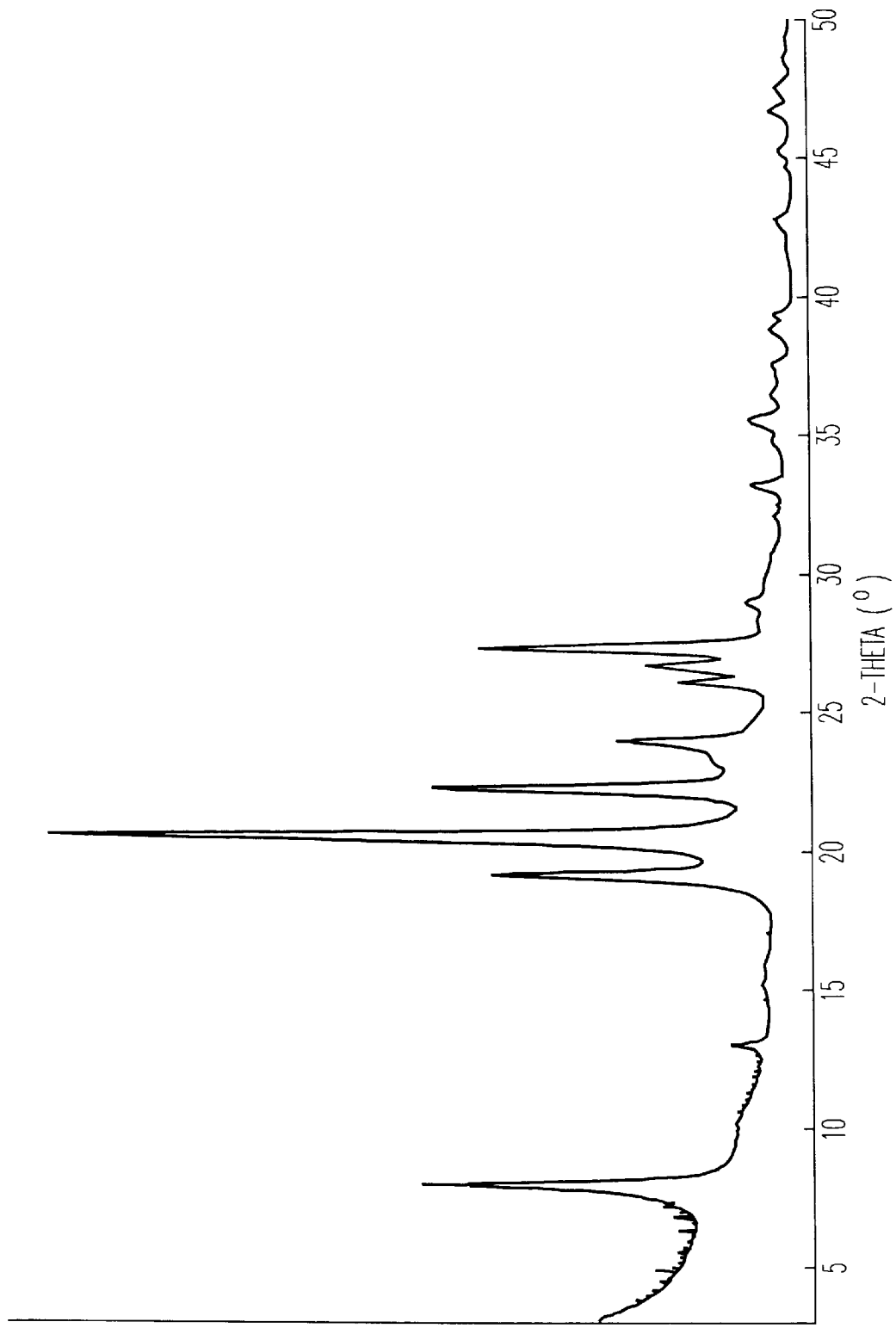
FIG. 1 is a powder x-ray diffraction pattern for calcined ERS-10.
Figure 2:
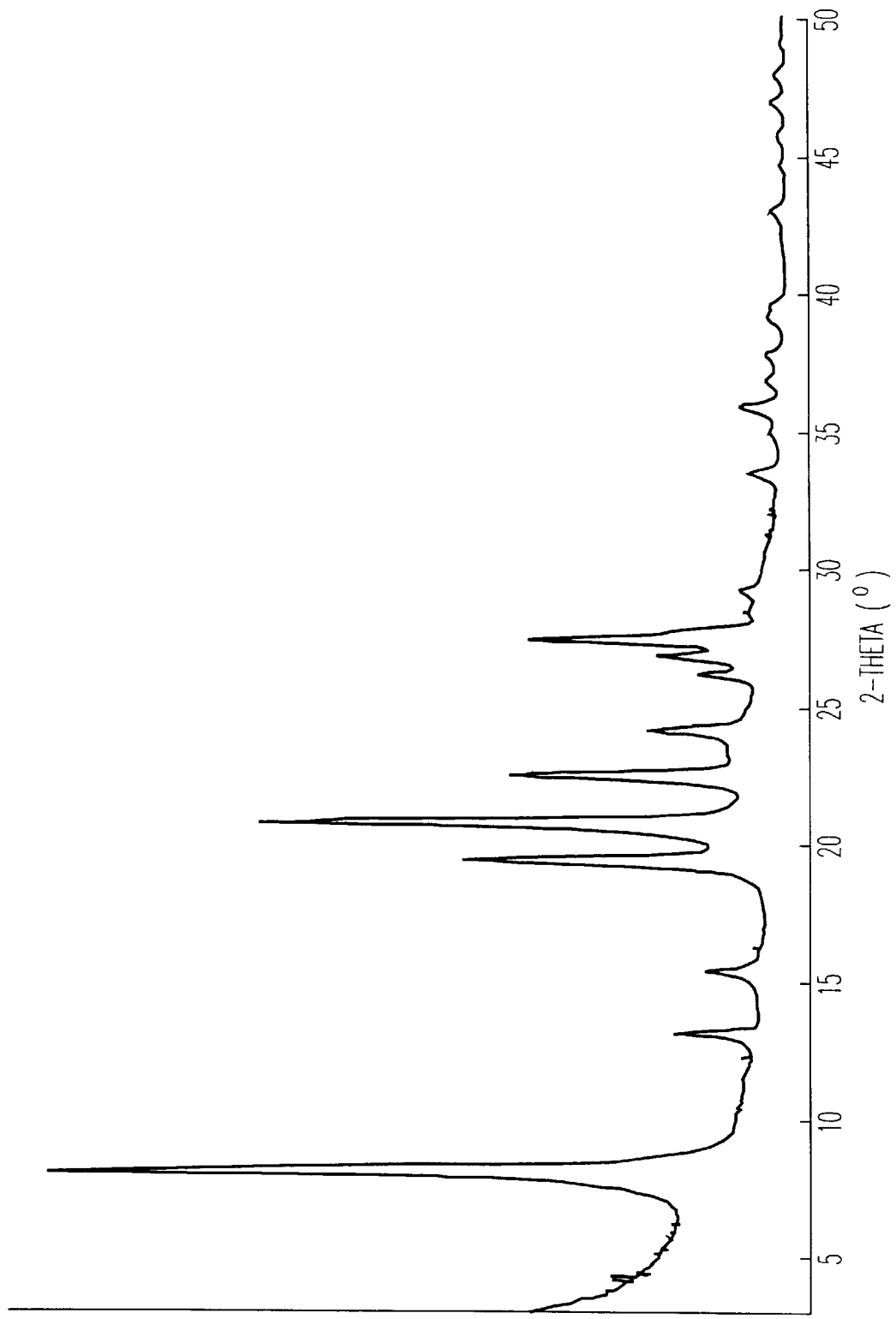
FIG. 2 is a powder x-ray diffraction pattern for ERS-10 after drying.
Figure 3:
FIG. 3 is a micrograph of an agglomerate of ERS-10.
Figure 4:
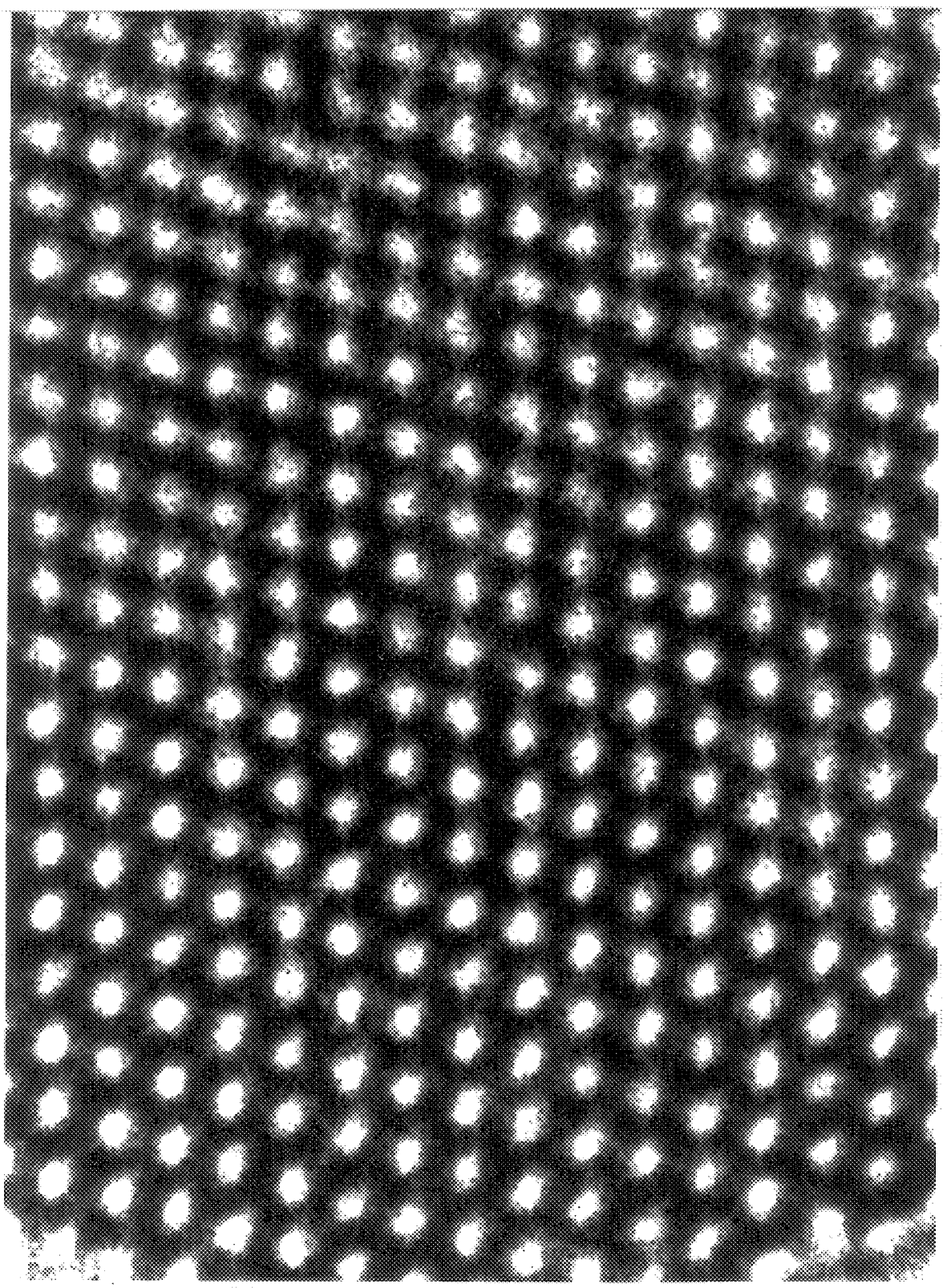
FIG. 4 is a micrograph of an agglomerate of ERS-10.

10.4 g of tetraethylortho silicate are added under stirring to a solution consisting of 45 g of demineralized water, 0.204 g of aluminum isopropylate, 0.19 g of sodium hydroxide and 1.71 g of 6-azonia spiro-[5,5]-undecane hydroxide (Q). These operations are carried out at room temperature. When the hydrolysis is complete an opalescent solution is obtained, having the following composition expressed as molar ratios:

$SiO_2/Al_2O_3=100/1$
$Na^+/SiO_2=0.095/1$
$Q/SiO_2=0.2/1$
$H_2O/SiO_2=50/1$
$OH^{-/SiO}{}_2=0.295$

The solution is then charged into a steel autoclave, placed in an oven and maintained at 170° C., under autogenous pressure, for 14 days. After cooling to room temperature, the crystalline product is separated from the mother liquor by filtration, washed with demineralized water and dried in an oven at 120° C. for 2 hours.

The composition of crystalline material, determined by elemental chemical analysis procedures, is the following:

67 $SiO_2$:1 $Al_2O_3$:0.5 $Q_2O$: 0.3 $Na_2O$:7 $H_2O$

The X-ray diffraction analysis of the powders is carried out with a vertical goniometer equipped with an electronic impulse count system (Philips), using CuK radiation ($\lambda$=1,54178 Å). The spectrum relating to this sample is shown in table 3.

TABLE 3

| d (Å) | 100.I/I$_O$ |
| --- | --- |
| 11.9 ± 0.10 | 41 |
| 6.82 ± 0.08 | 3 |
| 5.83 ± 0.06 | 2 |
| 4.64 ± 0.05 | 39 |
| 4.32 ± 0.05 | 100 |
| 4.00 ± 0.04 | 46 |
| 3.72 ± 0.03 | 21 |
| 3.42 ± 0.03 | 12 |
| 3.35 ± 0.03 | 17 |
| 3.27 ± 0.02 | 40 |
| 3.08 ± 0.02 | 4 |
| 2.70 ± 0.01 | 5 |
| 2.58 ± 0.01 | 2 |
| 2.54 ± 0.01 | 4 |
| 2.39 ± 0.01 | 2 |
| 2.32 ± 0.01 | 3 |
| 2.29 ± 0.01 | 3 |
| 2.12 ± 0.01 | 2 |
| 2.11 ± 0.01 | 3 |
| 2.03 ± 0.01 | 1 |
| 2.00 ± 0.01 | 2 |
| 1.94 ± 0.01 | 4 |
| 1.91 ± 0.01 | 3 |
| 1.87 ± 0.01 | 2 |
| 1.85 ± 0.01 | 1 |

The crystalline sample is then calcined at 550° C. for 5 hours in a stream of air. Chemical analysis shows the following composition:

67 $SiO_2$:1 $Al_2O_3$:0.3 $Na_2O$

The calcined product is subsequently subjected to exchange in acid form by repeated treatment with a solution of ammonium acetate at 80° C., washing with demineralized water and calcination at 550° C. for 5 hours.

The X-ray diffraction spectrum from powders relating to this sample in acid form is shown in table 4.

TABLE 4

| d (Å) | I/I$_O$.100 |
| --- | --- |
| 10.97 ± 0.10 | 100 |
| 6.79 ± 0.08 | 12 |
| 5.79 ± 0.06 | 8 |
| 4.59 ± 0.05 | 47 |
| 4.29 ± 0.05 | 79 |
| 3.96 ± 0.04 | 39 |
| 3.69 ± 0.03 | 17 |
| 3.41 ± 0.03 | 9 |
| 3.33 ± 0.03 | 16 |
| 3.26 ± 0.02 | 37 |
| 3.07 ± 0.02 | 4 |
| 2.68 ± 0.01 | 4 |
| 2.57 ± 0.01 | 1 |
| 2.50 ± 0.01 | 7 |
| 2.38 ± 0.01 | 3 |
| 2.31 ± 0.01 | 2 |
| 2.28 ± 0.01 | 2 |
| 2.11 ± 0.01 | 3 |
| 2.03 ± 0.01 | 1 |
| 1.99 ± 0.01 | 1 |
| 1.94 ± 0.01 | 2 |
| 1.90 ± 0.01 | 2 |

Acidity measurements carried out using pyridine as test molecule confirm the presence of Lewis and Brønsted sites.

EXAMPLE 2

The same procedure is adopted as in example 1, using 0.408 g of aluminum isopropylate. At the end of the hydrolysis an opalescent solution is obtained having the following composition expressed as molar ratios:
$SiO_2/Al_2O_3=50/1$
$Na^+/SiO_2=0.0475/1$
$Q/SiO_2=0.2/1$
$H_2O/SiO_2=45/1$
$OH^-/SiO_2=0.2475/1$ The X-ray diffraction spectra after drying and crystallization are similar to those indicated in tables 3 and 4, respectively.

EXAMPLE 3

0.315 g of $Al_2(SO_4)_3 \times 16\ H_2O$ and 10 g of Ludox® AS at 30% are added to a solution consisting of 33.5 g of demineralized water, 0.19 g of sodium hydroxide and 1.71 g of 6-azonia spiro-[5,5]-undecane hydroxide.

When the hydrolysis is complete a slightly opalescent solution is obtained having the following composition expressed as molar ratios:
$SiO_2/Al_2O_3=100/1$
$Na^+/SiO_2=0.095/1$
$Q/SiO_2=0.2/1$
$H_2O/SiO_2=45/1$
$OH/SiO_2=0.295/1$ The solution is then charged into a steel autoclave, placed in an oven and maintained at 170° C., under autogenous pressure, for 14 days. After cooling to room temperature, the crystalline product is separated from the mother liquor by filtration, washed with demineralized water and dried in an oven at 120° C. for 2 hours.

This sample has the X-ray diffraction data from powders indicated in table 3.

After calcination at 550° C. for 5 hours in air and exchange into acid form by repeated treatment with an aqueous solution of ammonium acetate at 80° C., drying at 120° C. and calcination at 550° C. for 5 hours in air, the pure ERS-10 phase is obtained characterized by an X-ray diffraction spectrum from powders completely similar to that shown in table 4.

EXAMPLE 4

The same procedure is adopted as in example 1, using 0.173 g of aluminum isopropylate and 10.4 g of tetraethylorthosilicate.

At the end of the hydrolysis a slightly opalescent solution is obtained having the following composition expressed as molar ratios:
$SiO_2/Al_2O_3=120/1$
$Na^+/SiO_2=0.095/1$
$Q/SiO_2=0.2/1$
$H_2O/SiO_2=45/1$
$OH/SiO_2=0.295/1$ After drying and calcination the material has the same X-ray diffraction data from powders indicated in tables 3 and 4, respectively.

EXAMPLE 5

The same procedure is adopted as in example 1, using 0.128 g of aluminum isopropylate and 10.4 g of tetraethylorthosilicate.

At the end of the hydrolysis a slightly opalescent solution is obtained having the following composition expressed as molar ratios:
$SiO_2/Al_2O_3=160/1$
$Na^+/SiO_2=0.095/1$
$Q/SiO_2=0.2/1$
$H_2O/SiO_2=45/1$
$OH/SiO_2=0.295/1$ After drying and calcination, the X-ray diffraction data from powders are identical to those indicated in tables 3 and 4, respectively.

EXAMPLE 6

10.4 g of tetraethylorthosilicate are added to a solution consisting of 45 g of demineralized water, 0.19 g of sodium hydroxide and 1.71 g of 6-azonia spiro-[5,5]-undecane hydroxide. When the hydrolysis is complete, a limpid solution is obtained having the following composition expressed as molar ratios:
$SiO_2/Al_2O_3\ \infty$
$Na^+/SiO_2=0.095/1$
$Q/SiO_2=0.2/1$
$H_2O/SiO_2=50/1$
$OH/SiO_2=0.295/1$ The solution is then charged into a steel autoclave, placed in an oven and maintained at 170° C., under autogenous pressure, for 7 days. After cooling to room temperature, the crystalline product is separated from the mother liquor by filtration, washed with demineralized water and dried at 120° C. for 2 hours. This sample mainly has the X-ray diffraction data from powders indicated in table 3.

After calcination at 550° C. for 5 hours in air, the pure ERS-10 phase is obtained characterized by an X-ray diffraction spectrum from powders completely similar to that shown in table 4.

EXAMPLE 7 (comparative)

15.6 g of tetraethylorthosilicate are added to a solution consisting of 27 g of demineralized water, 0.306 g of aluminum isopropylate and 3.85 g of 6-azonia spiro-[5,5]-undecane hydroxide. When the hydrolysis is complete a perfectly limpid solution is obtained having the following composition expressed as molar ratios:
$SiO_2/Al_2O_3=100/1$
$Q/SiO_2=0.3/1$
$H_2O/SiO_2=20/1$ The solution is charged into a steel autoclave, placed in an oven and maintained at 170° C. for 14 days under autogenous pressure. After cooling to room temperature, the crystalline product is separated from the mother liquor by filtration, washed with demineralized water and dried at 120° C. for 2 hours. The X-ray diffraction spectrum from powders shows the presence of the phase ZSM-12 (MTW).

The results indicate that the presence of sodium is essential for obtaining the ERS-10 zeolite.

EXAMPLE 8 (comparative)

10.4 g of tetraethylorthosilicate are added to a solution consisting of 40.5 g of demineralized water, 0.68 g of aluminum isopropylate, 0.62 g of sodium hydroxide and 1.71 g of 6-azonia spiro-[5,5]-undecane hydroxide.

When the hydrolysis is complete a homogeneous white suspension is obtained having the following composition expressed as molar ratios:
$SiO_2/Al_2O_3=30/1$
$Na^+/SiO_2=0.31/1$
$Q/SiO_2=0.2/1$
$H_2O/SiO_2=45/1$
$OH/SiO_2=0.51/1$ The solution is charged into a steel autoclave, placed in an oven and left for 14 days at 170° C. under autogenous pressure. After cooling to room temperature, the crystalline product is separated from the mother liquor by filtration, washed with demineralized water and dried at 120° C. for 2 hours. The X-ray diffraction spectrum from powders shows the presence of mordenite zeolite (MOR).

EXAMPLE 9

The calcined material obtained as described in example 1, can be used as molecular sieve. Absorption measurements were carried out using as test molecules $NH_3$, n-hexane, cyclohexane and mesitylene. These measurements were carried out according to the following procedure:
activation of the powder at 500° C. for 1 hour under vacuum at $6.10-5$ mbars;
stabilization of the system at the same vacuum value for 16 hours at 23° C.;
introduction of small quantities of vapor at 23° C. up to equilibrium;
evaluation of the adsorbed quantity with a known expansion coefficient of the test molecule and the pressures introduced upon equilibrium.

The adsorption capacity, expressed as g of adsorbed product per 100 g of catalyst, is shown in table 5.

TABLE 5

| Test molecule | Diameter (Å) | Adsorption (g/100 g ERS-10) |
|---|---|---|
| $NH_3$ | 2.6 | 2.35 |
| $n\text{-}C_6H_{14}$ | 4.3 | 3.10 |
| $C_6H_{12}$ | 6.0 | 2.15 |
| Mesitylene* | 8.1 | 0.45 |

*refers to an equilibrium pressure equal to 0.65 mbars.

We claim:

1. A porous, crystalline material, designated ERS-10 zeolite, and having in its calcined and anhydrous form a molecular composition of oxides corresponding to the formula (I):

$$mM_{2/n}O.zX_2O_3.YO_2 \qquad (I)$$

wherein m is a number between 0.01 and 10; M is $H^+$ or a cation of an alkali or alkaline earth metal, where n is such as to define valence for M; z is a number between 0 and 0.02; X represents one or more elements selected from the group consisting of aluminum, iron, gallium, boron, vanadium, arsenic, antimony, chromium and manganese; and Y represents one or more elements selected from the group consisting of silicon, germanium, titanium, and zirconium, which porous crystalline material exhibits an X-ray diffraction spectrum in the powder form as shown in Table 1.

2. The porous, crystalline material of claim 1, wherein M is selected from the group consisting of sodium, potassium, and hydrogen.

3. The porous, crystalline material of claim 2, wherein X is aluminum or aluminum partially substituted with an element selected from the group consisting of iron, gallium, boron, vanadium, arsenic, antimony, chromium and manganese.

4. The porous, crystalline material of claim 1, wherein Y is silicon or silicon partially substituted with an element selected from the group consisting of germanium, titanium and zirconium.

5. The porous, crystalline material of claim 1, which has an overall pore volume of between 0.13 and 0.19 cm³/g, and a surface area of about 350 m²/g.

6. The porous, crystalline material of claim 1, which is in a form of microspheres, granules or pellets.

7. The porous, crystalline material of claim 1, which exhibits a powder X-ray diffraction shown in Table 4.

8. A process for the preparation of the porous crystalline material of claim 1, which comprises:
   a) preparing an aqueous solution optionally containing at least one compound capable of hydrolyzing to $X_2O_3$, at least one compound capable of hydrolyzing to $YO_2$, a cation source of an alkali or alkaline earth metal, and an organic templating agent (Q), wherein said templating agent is an azo spiro compound having the formula (II):

wherein n and n', are the same or different, and represent an integer between 3 and 6, and $X^-$ is an anion selected from the group consisting of hydroxide, chloride, bromide, fluoride and iodide, and wherein a quantity of reagents is such as to respect the following molar ratios:
$YO_2/X_2O_3$ from 50/1 to $\infty$,
$OH/YO_2$ from 0.15/1 to 0.7/1,
$Q/YO_2$ from 0.1/1 to 0.5/1,
$H_2O/YO_2$ from 20/1 to 60/1, and
$M^+/YO_2$ from 0.05/1 to 0.02/1
   b) maintaining the solution obtained in a) under sufficient conditions to form a solid crystalline material;
   c) drying the solid crystalline material which in an anhydrous form has a molecular composition of oxides, corresponding to the formula (III):

$$yQ_2O.mM_{2/n}O.zX_2O_3.YO_2 \qquad (III)$$

wherein y has a value of between 0.1 and 1, Q is the organic templating agent having the formula (II), M is a cation of an alkali or alkaline earth metal or both, and m, n, z, X and Y are as defined above;
   d) calcining the crystalline material (III) obtained in step c); and
   e) at least partially substituting the cation M with $H^+$ to obtain the ERS-10 zeolite having the formula (I) in acid form.

9. The process of claim 8, wherein in step a) the compound capable of hydrolyzing to $X_2O_3$ is selected from the group consisting of aluminum isopropylate, aluminum sulfate, and $NaAlO_2$.

10. The process of claim 9, wherein the aluminum compound is selected from the group consisting of aluminum isopropylate and aluminum sulfate.

11. The process of claim 8, wherein in step a) the compound capable of hydrolyzing to $YO_2$ is a silicon compound selected from the group consisting of tetraethyl orthosilicate, colloidal silica, sodium silicate, and pyrophoric silica.

12. The process of claim 11, wherein the silicon compound is selected from the group consisting of tetraethyl orthosilicate and colloidal silica.

13. The process of claim 8, wherein the cation source is sodium or potassium hydroxide.

14. The process of claim 8, wherein the organic templating agent (Q) is a compound having the formula (II) wherein n and n', are the same as each other, and have a value equal to 5, and X⁻ is hydroxide.

15. The process of claim 8, wherein X is silicon and the quantity of constituents of the solution is such as to respect the following molar ratios:

SiO₂/X₂O₃ from 80/1 to ∞,

OH⁻/SiO₂ from 0.2/1 to 0.45/1,

Q/SiO₂ from 0.2/1 to 0.3/1,

H₂O/SiO₂ from 40/1 to 50/1, and

M⁺/SiO₂ from 0.09/1 to 0.15/1.

16. The process of claim 8, wherein step b) is carried out at a temperature of between 150° C. and 180° C., and for a time of from 3 to 28 days.

17. The process of claim 10, wherein the temperature is about 170° C. and the reaction time is between 7 and 14 days.

18. The process of claim 8, wherein in step c), the drying is carried out at a temperature of up to 170° C.

19. The process of claim 13, wherein said drying is carried out at a temperature between 90 and 120° C.

20. The process of claim 8, wherein in step d), the calcination is carried out at a temperature of between 500 and 700° C. and for a time of between 4 and 20 hours.

21. The process of claim 17, wherein the calcination is carried out at a temperature of between 550 and 650° C. and for a time of from 6 to 15 hours.

22. The process according to claim 8, wherein in step e), the substitution is carried out by ion exchange using a mineral acid or an ammonium salt.

23. The process of claim 19, wherein said mineral acid is hydrochloric acid.

24. The process of claim 19, wherein said ammonium salt is ammonium acetate.

25. A zeolitic precursor having in an anhydrous form thereof a molecular composition of oxides corresponding to the formula (III):

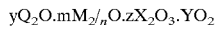  (III)

wherein y has a value of between 0.1 and 1, Q is the organic templating agent having the formula (II):

 (II)

wherein n and n', are the same or different, represent an integer between 3 and 6, and X⁻ is an anion selected from the group consisting of hydroxide, chloride, bromide, fluoride and iodide, M is a cation of an alkali or alkaline earth metal having a valence of n, Z is the number between 0 and 0.02, X represents one or more elements selected from the group consisting of aluminum, iron, gallium born, vanadium, arsenic, antimony, chromium and manganese; and Y represents one or more elements selected from the group consisting of silicon, germanium, titanium, and zirconium, wherein said porous crystalline material exhibits a powder X-ray diffraction spectrum shown in Table 2.

26. A method of catalytically converting hydrocarbons, which comprises reacting one or more hydrocarbons in the presence of the porous crystalline material, designated ERS-10 zeolite, of claim 1.

27. The method of claim 26, wherein said ERS-10 zeolite effects cracking.

28. The method of claim 26, wherein said ERS-10 zeolite effects isomerization.

29. The method of claim 26, wherein said ERS-10 zeolite effects oligomerization.

30. The method of claim 26, wherein said ERS-10 zeolite effects alkylation.

31. A method of effecting ion exchange, which comprises effecting said ion exchange with the porous, crystalline material of claim 1.

32. A method of effecting molecular sieving, which comprises effecting said molecular sieving with the porous, crystalline material of claim 1.

* * * * *